United States Patent
Hon et al.

(10) Patent No.: US 8,899,607 B2
(45) Date of Patent: Dec. 2, 2014

(54) REINFORCING AND LOCKING DEVICE FOR VEHICLE FRAME

(75) Inventors: David Tak-Wei Hon, Guangdong (CN); Zheng Li, Guangdong (CN); Yiping Mo, Guangdong (CN)

(73) Assignee: Dahon Technologies, Ltd. (CN)

( * ) Notice: Subject to any disclaimer, the term of this patent is extended or adjusted under 35 U.S.C. 154(b) by 11 days.

(21) Appl. No.: 13/821,640

(22) PCT Filed: Feb. 28, 2011

(86) PCT No.: PCT/CN2011/071373
§ 371 (c)(1),
(2), (4) Date: May 21, 2013

(87) PCT Pub. No.: WO2012/031472
PCT Pub. Date: Mar. 15, 2012

(65) Prior Publication Data
US 2013/0228996 A1 Sep. 5, 2013

(30) Foreign Application Priority Data
Sep. 8, 2010 (CN) .......................... 2010 1 0280472

(51) Int. Cl.
*B62K 15/00* (2006.01)
*B62K 19/28* (2006.01)

(52) U.S. Cl.
CPC ............... *B62K 15/006* (2013.01); *B62K 19/28* (2013.01); *B62K 15/008* (2013.01)
USPC .......................................... 280/287; 280/278

(58) Field of Classification Search
CPC .... B62K 15/006; B62K 15/008; B62K 19/28; F16D 1/02; F16D 1/101; F16D 1/112
USPC ............ 280/287, 278; 403/386, 230, 186, 87, 403/85, 84, 66, 49, 322.4, 314, 320, 290, 403/385, 409.1; 248/229.11, 222.3, 221.11, 248/220.21, 215, 214, 74.1, 73, 72; 242/419.1
See application file for complete search history.

(56) References Cited

U.S. PATENT DOCUMENTS

| | | | | |
|---|---|---|---|---|
| 3,865,403 A | * | 2/1975 | Majerus | 280/287 |
| 4,566,713 A | * | 1/1986 | Hon | 280/287 |
| 7,243,936 B2 | * | 7/2007 | Huang | 280/278 |
| 8,091,908 B2 | * | 1/2012 | Wilson et al. | 280/204 |
| 2005/0230933 A1 | * | 10/2005 | Woo | 280/278 |

FOREIGN PATENT DOCUMENTS

| | | | | |
|---|---|---|---|---|
| CN | 2457010 Y | * | 12/2000 | ............ B62K 15/00 |
| CN | 2457010 Y | | 10/2001 | |
| CN | 2490046 Y | | 5/2002 | |
| CN | 2737659 Y | | 11/2005 | |
| CN | 1749098 A | | 3/2006 | |
| JP | 2006335143 A | * | 12/2006 | |

* cited by examiner

*Primary Examiner* — Joseph M Rocca
*Assistant Examiner* — Daniel Yeagley
(74) *Attorney, Agent, or Firm* — Shaukat A. Karjeker; Colin P. Cahoon; Carstens & Cahoon, LLP (57) ABSTRACT

A reinforcing and locking device for vehicle frame includes a reinforcing component (2), a connecting component and an eccentric locking component, the vehicle frame comprises a beam (1) and a seat tube (3). The beam (1) can be folded into at least two segments (11, 12). A hinge axle (81), through which various segments of the vehicle beam (1) are hinged with each other, is provided vertically. The reinforcing component (2) is connected to the beam (1) and the seat tube (3). The seat tube (3) is provided with a connecting component. A front end of the reinforcing component (2) is hinged with a front segment (11) of the beam (1), and a rear end of the reinforcing component (2) is connected with the seat tube (3) through the connecting component. The reinforcing and locking device for vehicle frame has good stability, simple structure and low cost.

14 Claims, 13 Drawing Sheets

Fig.1

PRIOR ART

REINFORCING AND LOCKING DEVICE FOR VEHICLE FRAME

TECHNICAL FIELD

The present invention relates to a reinforcing and locking device, and more particularly, to a reinforcing and locking device for vehicle frame.

BACKGROUND OF THE INVENTION

Folding bicycles are becoming more and more popular. Nowadays, most folding bicycles are provided with a folding joint on the beam, such that the beam can be folded into two segments when not in use. When in use, the front segment and the rear segment of the beam are locked through a locking device on the folding joint. The folding joints, which are disclosed in Chinese patents CN200420093887.5 and CN01255435.9, are common ones widely used in bicycles. Chinese patent CN00260163.X, whose applicant is the same as the present invention, discloses a reinforced mechanism of folding joint of single beam folding bicycle; and in the second embodiment of the patent, a reinforcing arm, which is connected with the beam and the seat tube, is provided, but only to reinforce the beam, while the original folding joint and the locking device for the folding bicycle are still necessary, and an additional fixing seat should be provided on the seat tube; when the folding bicycle is in normal use, following steps are necessary: locking the folding joint of the beam, locking the clamping ring for the seat tube, and buckling the reinforced mechanism to the fixing seat of the seat tube, as a result, too many steps are needed, it is inconvenient for use and the bicycle can't be unfolded or folded quickly.

Figure 1:
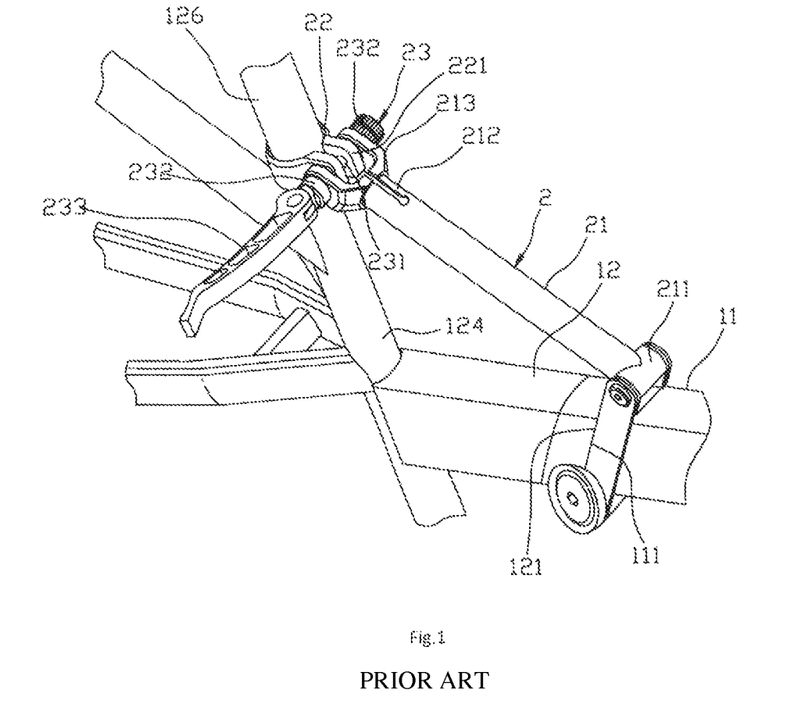
FIG. 1 is a schematic view of the prior art.

Moreover, the Chinese patent application No. 200510025883.2 discloses a folding bicycle, as shown FIG. 1, the folding bicycle can be folded in a direction parallel to the plane of the front hub and the rear hub. The hinge axle is provided horizontally, and the opening of the folding joint faces upward. The folding joint is provided with a pivot 211, which is provided with a connecting bar 2. The connecting bar is connected to the C-shaped ring 22 and is locked horizontally. After the connecting bar 2 and the hook 213 are locked, there are no horizontal displacements relative to their original position. The defects of this scheme are as follows: no pretightening force is exerted on the connecting bar 2 in the direction along which the folding joint is buckled, as a result, when the connecting bar 2 moves upwards due to the rough road or other impacts in cycling, the beam will break, which will bring great potential safety risks. When the connecting bar 2 moves upwards, the resistant force exerted on the connecting bar is only the frictional force generated by locking horizontally, which makes the margin of safety extremely thin. Moreover, the pivot 211 is provided on the contacting surfaces on the front frame, so the effect of locking on the contacting surfaces on the front frame is rather limited. Moreover, when in cycling, the C-shaped ring 22 is loose and apt to slide along the seat tube, which will cause the connecting bar 2 loose and will bring unsafe factor.

How to improve the strength of the beam and unfold or fold the bicycle with fewer steps has become an urgent problem to be solved.

SUMMARY OF THE INVENTION

The present invention is aimed at providing a reinforcing and locking device for vehicle frame, which can fold or unfold the vehicle body rapidly, reinforce the beam, produce pretightening force for contacting surfaces of the beam, and which has better stability, simple structure and lower cost.

The object of the present invention is achieved by the following technical scheme: a reinforcing and locking device for vehicle frame includes a reinforcing component, a connecting component and a locking component, the vehicle frame includes a beam and a seat tube; the beam includes at least two foldable segments; a hinge axle for hinging the segments of the beam is provided vertically; the reinforcing component is connected with the beam and the seat tube; the connecting component is provided on the seat tube; a front end of the reinforcing component is hinged to a front segment of the beam; a rear end of the reinforcing component is connected to the seat tube through the connecting component; and the reinforcing component is locked by the locking component, so that the rear end of the reinforcing component deviates from its original position and moves to one side of the beam, where the hinge axle is installed.

The locking component is an eccentric locking component, through which the rear end of the reinforcing component is locked; and the rear end of the reinforcing component is displaced under a force of the eccentric locking component.

The eccentric locking component comprises a rod, a nut and an eccentric handle; the rod runs through clamp heads of the connecting component; the nut is disposed on one end of the rod and the eccentric handle is disposed on the other end of the rod; and the rear end of the reinforcing component is provided with a hook, which hooks the rod and is locked and fixed.

In an original position of natural connection, a center of the rear end of the reinforcing component deviates from a vertical plane containing a center line of the beam; and the center of the rear end of the reinforcing component and the hinge axle of the beam are respectively disposed at different sides of the vertical plane containing the center line of the beam.

The connecting component is an integral clamping ring integrated by a connecting part and a clamping ring for the seat tube.

Surfaces of two clamp heads of the integral clamping ring deviate from a center of the integral clamping ring; the integral clamping ring is additionally provided with a reinforcing lug parallel to the clamp heads; and the reinforcing lug and the two clamp heads are respectively disposed at different sides of the center of the integral clamping ring.

The connecting component comprises a front cover and a rear cover; the front cover and the rear cover are joined and locked through bolts; and the front cover is provided with clamp heads.

The beam comprises three segments and is provided with two hinge axles which are parallel; and when the vehicle is folded, axis of an intermediate segment of the beam is approximately perpendicular to those of the front segment and a rear segment of the beam.

The reinforcing and locking device for vehicle frame of the present invention has simple structure and is easy to operate. The contacting surface of each segment of the beam only needs to be hinged and no locking component needs to be provided, so the step of locking is not needed and time is saved greatly. Compared with its natural position, when the rear end of the reinforcing component is locked, it moves to one side of the beam where the hinge axle is installed, so the rear end of the reinforcing component locks the front and rear segments of the beam, and also becomes an upper tube of the front triangle of the vehicle frame, which improves the load capacity of the single beam vehicle greatly. In the integral clamping ring integrated by the connecting component and the clamping ring for the seat tube, the locking component locks the rear end of the reinforcing component, and also locks the upper and lower segments of the seat tube, so one operation can achieve two locking functions, which makes it a reality to fold and unfold the vehicle quickly and easily. Moreover, in the vehicle with three segments of beam, after the vehicle is folded, the intermediate segment of the beam is approximately perpendicular to the front segment and the rear segment of the beam; so the whole length of the folded beam with three segments is further reduced relative to the folded beam with two segments, and the size of the packing case can also be reduced, which saves the wrapper and is environment friendly, the storage space is saved and the bicycle is easy to store.

DETAILED DESCRIPTION OF THE PREFERRED EMBODIMENTS

The reinforcing and locking device for vehicle frame of the present invention will be described in more details with reference to the accompanying FIGS. 2-20.

Figure 2:
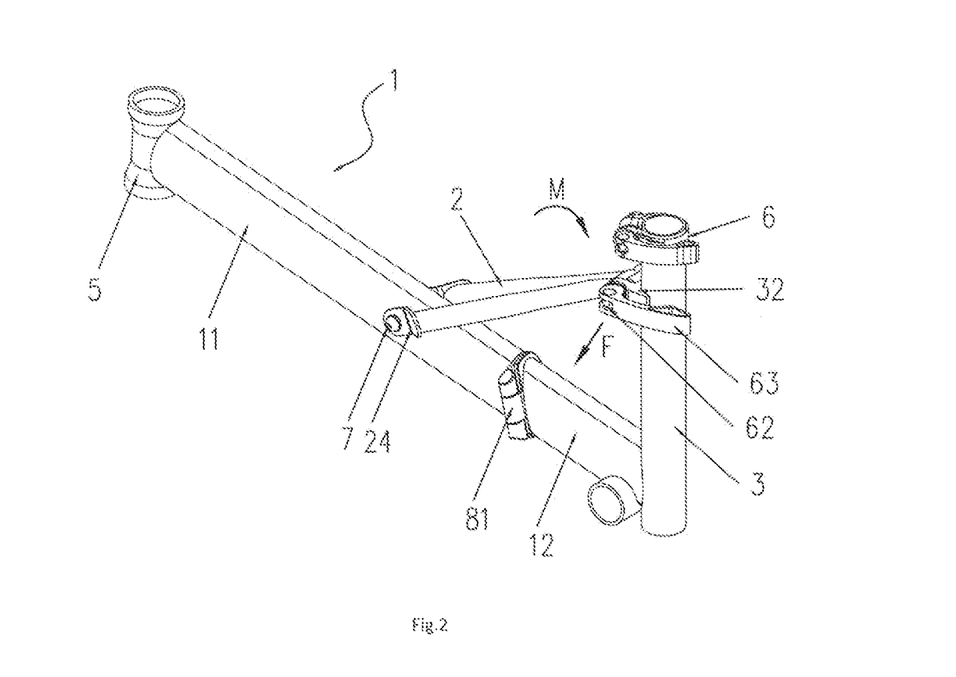
FIG. 2 is a schematic view illustrating the first embodiment of the reinforcing and locking device for vehicle frame of the present invention.
Figure 3:
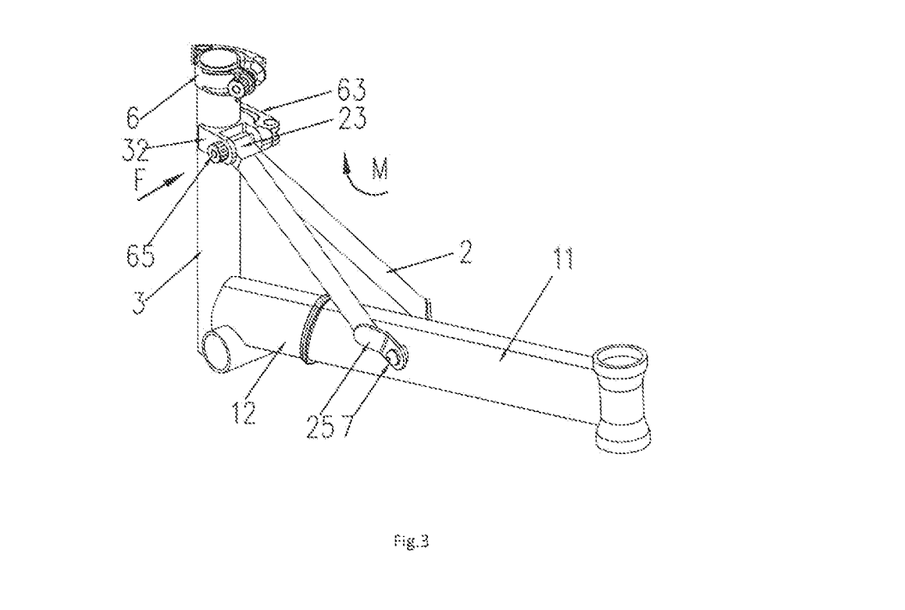
FIG. 3 is a schematic view illustrating the first embodiment of the reinforcing and locking device for vehicle frame of the present invention in another direction.
Figure 4:
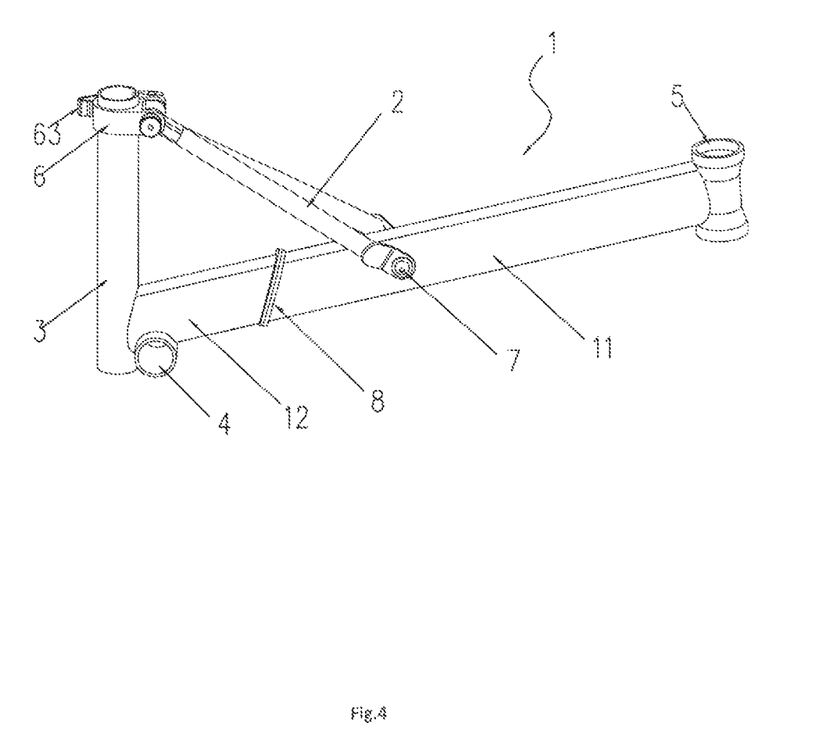
FIG. 4 is a schematic view illustrating the second embodiment of the reinforcing and locking device for vehicle frame of the present invention.
Figure 5:
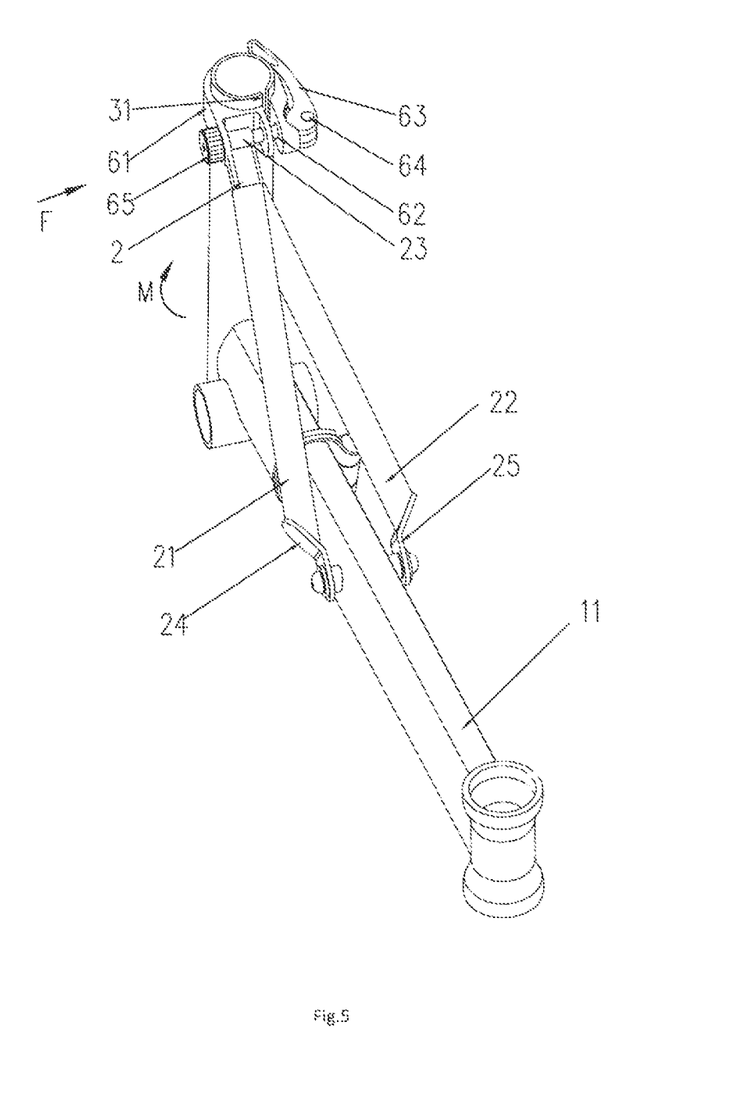
FIG. 5 is a schematic view illustrating the second embodiment of the reinforcing and locking device for vehicle frame of the present invention in another direction.
Figure 6:
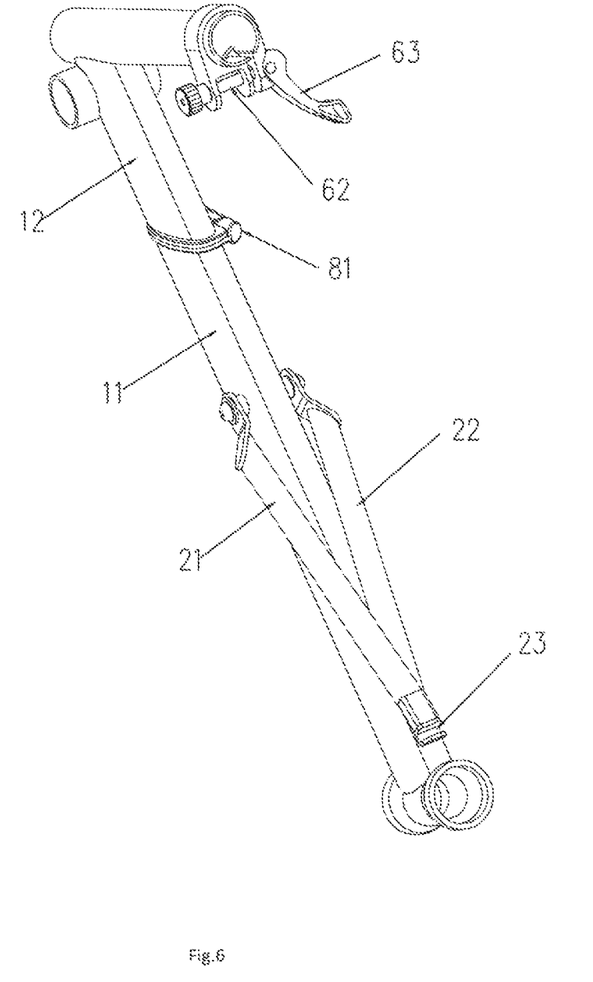
FIG. 6 is a schematic view illustrating the unlocked reinforcing component of the reinforcing and locking device for vehicle frame of the present invention.
Figure 7:
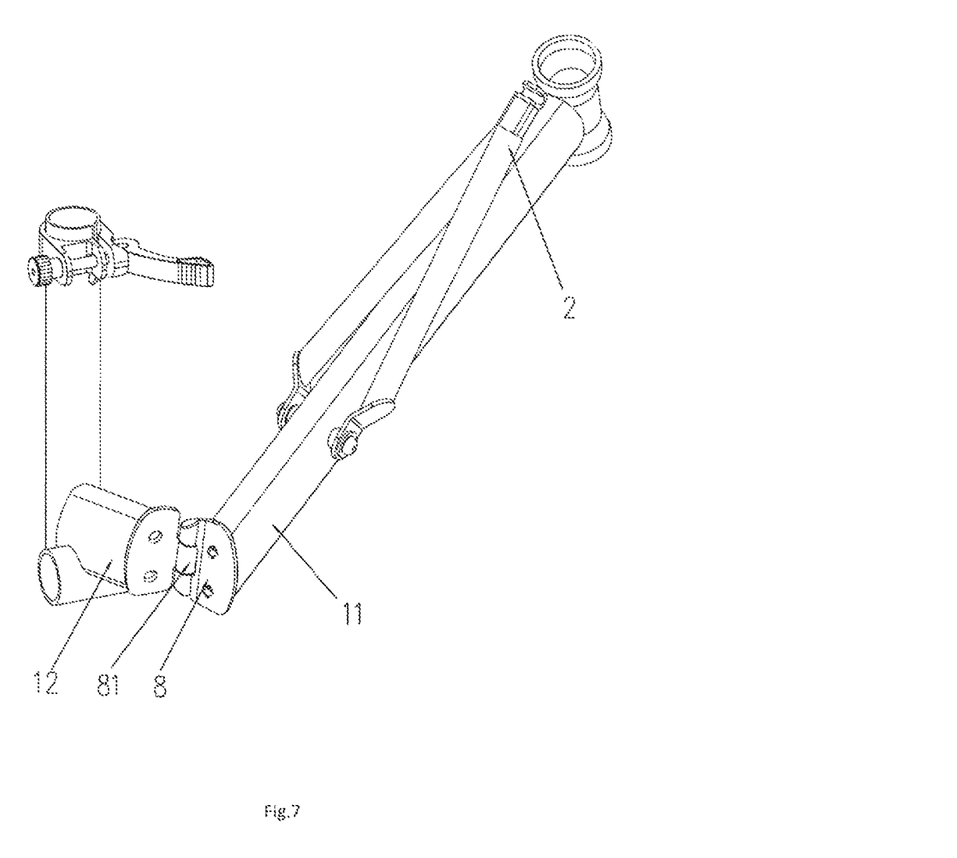
FIG. 7 is a schematic view illustrating the unfolded folding joint of reinforcing and locking device for vehicle frame of the present invention.
Figure 8:
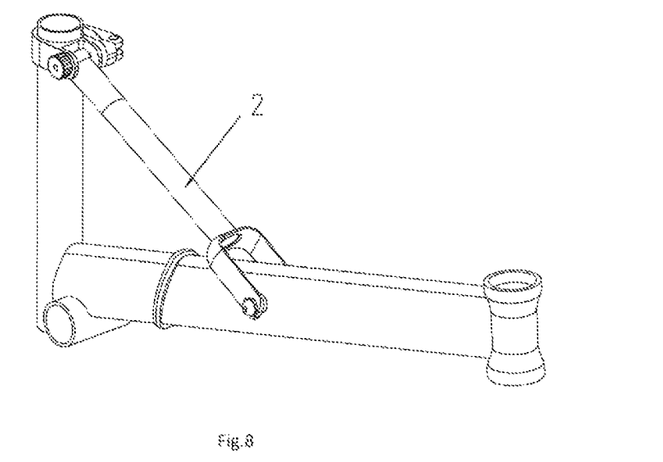
FIG. 8 is a schematic view of another kind of reinforcing component according to the second embodiment of the reinforcing and locking device for vehicle frame of the present invention.

As shown in FIGS. 2 and 3, in the first embodiment, the vehicle frame comprises a beam 1, a seat tube 3 and a head tube 5. The seat tube 3 is provided with a connecting part 32. A clamping ring 6 is provided at top of the seat tube 3 to clamp the seat tube 3 and an upper segment of the seat tube, the upper segment of the seat tube is used for supporting the seat but not shown in the figures. The beam 1 comprises a front segment 11 and a rear segment 12, which are hinged together through a hinge axle 81. The head tube 5 is welded on the front segment 11 of the beam, and a five-way pipe and the seat tube 3 are welded on the rear segment 12 of the beam. A reinforcing component 2 is connected to the front segment 11 of the beam and the seat tube 3. The connecting part 32 provided on the seat tube 3 may be in the form of a fixing base fixed and welded on the seat tube 3, or a clamping ring sleeved on the seat tube 3. The hinge axle 81 is parallel to a plane determined by the beam and the seat tube 3. Especially, when the vehicle rests on a horizontal plane, the hinge axle 81 on the beam is perpendicular to the horizontal plane approximately. A front end of the reinforcing component 2 is hinged to a first hinged shaft 7 which is fixed on the front segment 11 of the beam and has two ends extending towards two sides of the beam respectively. The reinforcing component may be hinged to the first hinged shaft 7 directly or connected to the first hinged shaft 7 through connecting sheets 24, 25 provided respectively at front ends of two arms of the reinforcing component 2. Traverse distance between the front ends of the two arms of the reinforcing component 2 is greater than transverse width of the beam. Therefore the reinforcing component can bear greater bending moment and is less deformable, and its stability is improved. The connecting part 32 is provided with a transverse rod 62, the transverse rod 62 is provided with a nut 65 on one end and an eccentric handle 63 on the other end. The rear end of the reinforcing component 2 is provided with a hook 23, the hook 23 hooks the transverse rod 62 of the connecting part 32 and is clamped and fixed.

Specifically, the front segment 11 and the rear segment 12 of the beam 1 are coupled first, then the hook 23 at the rear end of the reinforcing component 2 hooks the rod 62 naturally. The whole assembly of reinforcing component 2 and the connecting part 32 is disposed at an upper side of the beam 1. Tighten the eccentric handle 63 to create a force F, direction of which is shown in FIGS. 2 and 3, so as to force the rear end of the reinforcing component 2 to move to the side of the beam 1 where the hinge axle 81 is installed. Accordingly, with the front end of the reinforcing component 2 as the base, the reinforcing component 2 as a whole creates a moment M shown in Figures. The hinge axle 81 of the beam and the handle 63 are disposed at the same side of the beam. At the other side of the hinge axle 81, where no locking device is provided, the front segment 11 and rear segment 12, which are naturally joined initially, will be coupled more stably under the moment M and not easy to release during cycling. At the original position of natural connection, the center of the rear end of the reinforcing component 2 deviates from a vertical plane containing the center line of the beam, and the center of the rear end of the reinforcing component and the hinge axle of the beam are disposed at different sides of the vertical plane containing the center line of the beam. When the rear end of the reinforcing component is locked, the center of the rear end approximately falls in the vertical plane containing the center line of the beam. Compared with the prior art, the front segment 11 and the rear segment 12 of the beam of the present invention are hinged only at one side, and no locking devices need to be provided at the other side, which reduces components as well as the cost. Moreover, the present invention eliminates the locking operation at the beam and therefore saves operating time. What's more, in the prior art, the beam is provided with a hinging device and a locking device, while the rear end of the reinforcing component 2 just hooks the connecting part 32, but no other fixing devices are provided, as a result, when the vehicle is jogging up and down the road, the hook is easy to release from the connecting part 32, and the reinforcing function of the reinforcing component 2 cannot be guaranteed.

The rod 62 is provided with the nut 65 on one end and the eccentric handle 63 on the other end. The eccentric handle 63 may be replaced with a common nut, and the rod can also be strained to lock the rear end 23 of the reinforcing component by tightening the nut, so that the nut can achieve the same effect just as the eccentric handle 63 does, but that the eccentric handle is just more convenient to operate.

As shown in FIGS. 2 and 3, the whole assembly of the reinforcing component 2 and the connecting part 32 are disposed at the upper side of the beam 1. Alternatively, the whole assembly of the reinforcing component 2 and the connecting part 32 may be disposed at the lower side of the beam 1, and this arrangement can also realize the object of the present invention, except that the direction and the position are opposite, which is not described here in details.

As shown in FIGS. 4, 5, 6, 7 and 8, in the second embodiment, the beam comprises the front segment 11 and the rear segment 12, which are hinged together through the hinge axle 81. The head tube 5 is welded on the front segment 11 of the beam, and the rear segment 12 of the beam, on which a five-way pipe 4 is welded, is welded on the seat tube 3. The reinforcing component 2 is connected to the front segment 11 of the beam and the seat tube 3. The connecting component for connecting the rear end of the reinforcing component 2 and the seat tube 3 is the clamping ring 6, which is sleeved on the seat tube 3. The connecting component in the second embodiment is an integral clamping ring integrated by the connecting part 32 and the clamping ring 6 for the seat tube in the first embodiment, which can reduce the cost and simplify the operating procedures, but higher manufacturing precision is required. Alternatively, the connecting component in this embodiment may be in the form of two clamping rings, one clamping ring is used for connecting the reinforcing component 2, and the other is used for clamping the upper segment and the lower segment of the seat tube, which has the same stability without requirement for high manufacturing precision.

In the second embodiment, the front end of the reinforcing component 2 is ∩-shaped or ∧-shaped so as to have two arms, and the two arms 21, 22 are hinged to the first hinged shaft 7 which is fixed on the front segment 11 of the beam and has two ends extending towards two sides of the beam respectively. The reinforcing component may be hinged to the first hinged shaft 7 directly or connected to the first hinged shaft 7 through connecting sheets 24, 25 provided respectively at front ends of two arms of the reinforcing component 2. Traverse distance between the front ends of the reinforcing component 2 is greater than transverse width of the beam. Therefore the reinforcing component can bear greater bending moment and is less deformable, and its stability is improved. The rear end of the reinforcing component 2 is provided with the hook 23; the hook 23 hooks the rod 62 of the eccentric locking component and is locked and fixed.

A pipe slit 31 is disposed at the top end of the seat tube 3. And a clamping ring 6 for the seat tube is provided, clamp heads 611, 612 of the clamping ring are locked by the eccentric locking component. The eccentric locking component comprises the rod 62, an eccentric handle 63, a central spindle 64 and a nut 65. The rod 62 runs through the clamp heads 611, 612, and the rod is provided with the nut 65 on one end and the eccentric handle 63 on the other end. Stretching, shortening or fixing the upper segment of the tube seat can be performed by means of the clamping ring 6 for the seat tube and the eccentric locking component, so as to reduce the height of the vehicle body folded. The rod 62 in the second embodiment is longer than a common one in order to leave space for fixing the hook 23. Before riding a bicycle, following steps are needed simply: couple the front segment 11 and the rear segment 12 of the beam 1; then make the hook 23 at the rear end of the reinforcing component 2 hook the rod 62, simultaneously stretch the upper segment of the seat tube to proper length; at last, lock the hook with the eccentric locking component. The eccentric handle 63 and the hinge axle 81 for joining the front segment and the rear segment of the beam are disposed at the same side of the beam. After the hook 23 is locked by the eccentric handle, the hook moves to the side where the hinge axle 81 is installed, so as to create moment M and make the other side of the beam opposite to the hinge axle 81 to be joined more tightly. The hinge axle 81 is parallel to the plane determined by the beam 1 and the seat tube 3. More specially, the hinge axle 81 is perpendicular to the horizontal plane.

The present invention described above and its operating procedures are distinguished from the prior art in that: in the prior art, the front segment 11 and the rear segment 12 of the beam are hinged together and locked through a locking device of joint; however, the present invention eliminates the locking device of joint and saves the cost. More important, the locking device of the joint in the prior art locks the beam through a handle. For some vehicles, in order to prevent the handle's turning, which will cause the unlocking of the locking device, the rear end of the handle has to be hooked through another hook, so normally one or two steps are needed for locking the beam. In the present invention, the beam only needs to be hinged, and no locking device or handle of joint is needed, so that no steps for locking the beam are needed and the time is saved. In the present invention, the hook 23 at the rear end of the reinforcing component 2 hooks the rod 62, so the reinforcing component, the upper seat tube and the lower seat tube can be locked simultaneously by operating the eccentric handle 63 of the eccentric locking component, which improves the strength of the vehicle body and shortens time of folding as well.

Figure 9:
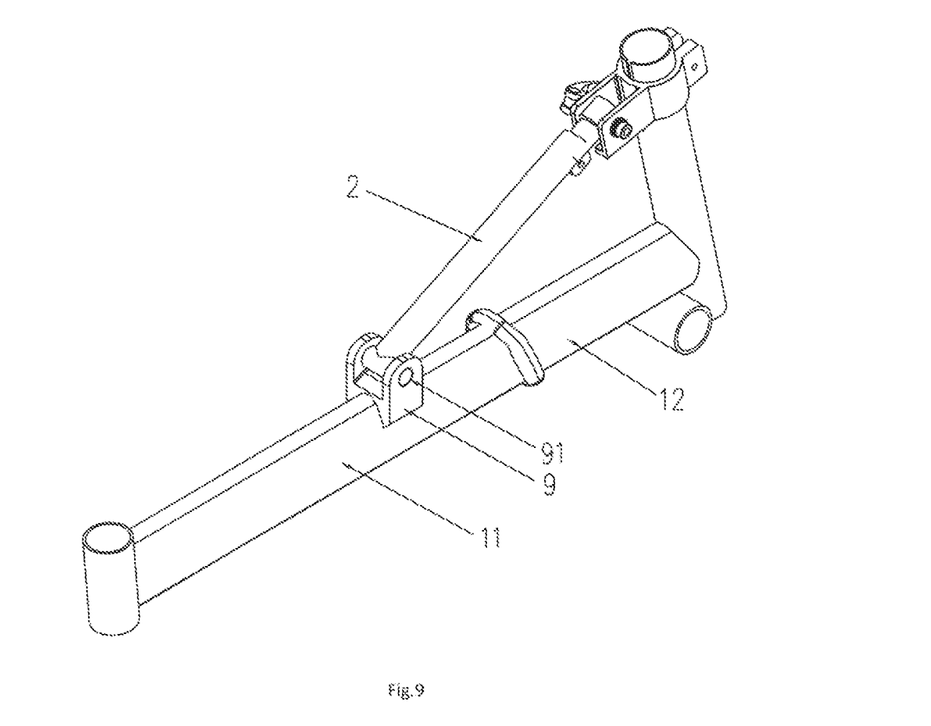
FIG. 9 is a schematic view illustrating the third embodiment of the reinforcing and locking device for vehicle frame of the present invention.

As shown in FIG. 9, in the third embodiment, a base 9 with two projecting lugs is provided on the front segment 11 of the beam. The front end of the reinforcing component 2 is hinged between the two projecting lugs through a second hinged shaft 91, and the rear end of the reinforcing component 2 and the seat tube are connected through the clamping ring of the seat tube and locked through the locking component. The hinge axle 81 for hinging the front segment and the rear segment of the beam is provided at the same side where the eccentric handle of the eccentric locking component is installed.

Figure 10:
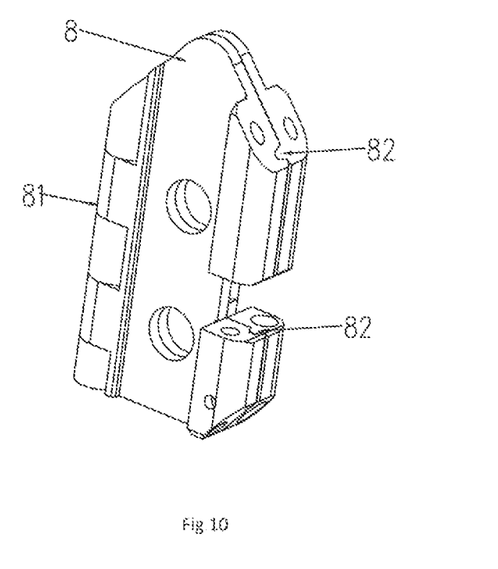
FIG. 10 is a schematic view illustrating the matching of the protrusion and the groove of the folding joint of the reinforcing and locking device for vehicle frame of the present invention.

As shown in FIG. 10, the front segment 11 and the rear segment 12 can rotate relative to each other by means of the hinge axle 81 of the folding joint 8. The contact interfaces of the front segment 11 and the rear segment 12 of the beam may be constructed into concave and convex surfaces matching with each other, which can prevent the joint from being dislocated in cycling, so as to improve the stability of the beam. For example, one contact interface may be provided with a protrusion 82 and the other interface is provided with a groove matching with the protrusion. As shown in FIG. 10, the protrusion matches the groove vertically, which prevents the vehicle body from being dislocated transversely. Alternatively, the protrusion and the groove matching with each other transversely may be provided in the contact interfaces to prevent the vehicle body from being dislocated vertically due to the rough road. Alternatively, one contact interface of the beam may be provided with a monolithic groove with surrounding edges to enclose the other contact interface.

Figure 11:
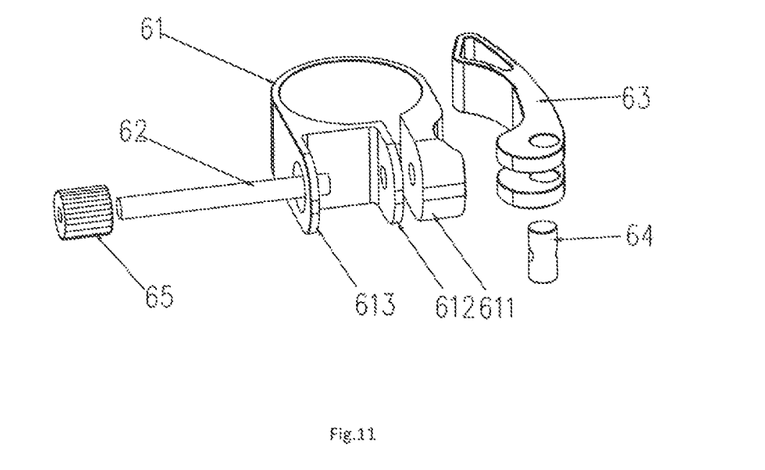
FIG. 11 is an exploded view illustrating the clamping ring for the seat tube of the reinforcing and locking device for vehicle frame of the present invention.

FIG. 11 is a schematic view illustrating the integral clamping ring for the seat tube and the eccentric locking component. As shown in FIG. 11, the rod 62 of the eccentric locking component runs through the clamp heads 611, 612 of the integral clamping ring. Surfaces of the two clamp heads of the integral clamping ring deviate from the center of the integral clamping ring, which makes arrangement of the hook 23 of the reinforcing component more reasonable. The integral clamping ring is provided with a reinforcing lug 613 to improve the stress status of related components and make the hook 23 to be locked more reliably. The reinforcing lug 613 is parallel to the clamp heads and it is disposed at a different side of the center of the integral clamping ring opposite to the side where the clamp heads are located. The hook 23 hooks the rod 62 of the eccentric locking component between the clamp heads 612 and the reinforcing lug 613. Tighten the eccentric handle 63, and the rod 62 will move to the right; loosen the eccentric handle, and the rod 62 will move to the left.

After it is locked, the rear end of the reinforcing component deviates from its original position in natural connection and moves to the same side where the eccentric handle is installed. The eccentric handle and the hinge axle 81 of the beam are disposed at the same side to enable the front end and the rear end of the beam to be coupled more tightly and stably. The reasonable displacement is based on an overall consideration of the length and the material of the reinforcing component. Preferably, the displacement ranges from 2 mm to 8 mm.

Figure 12:
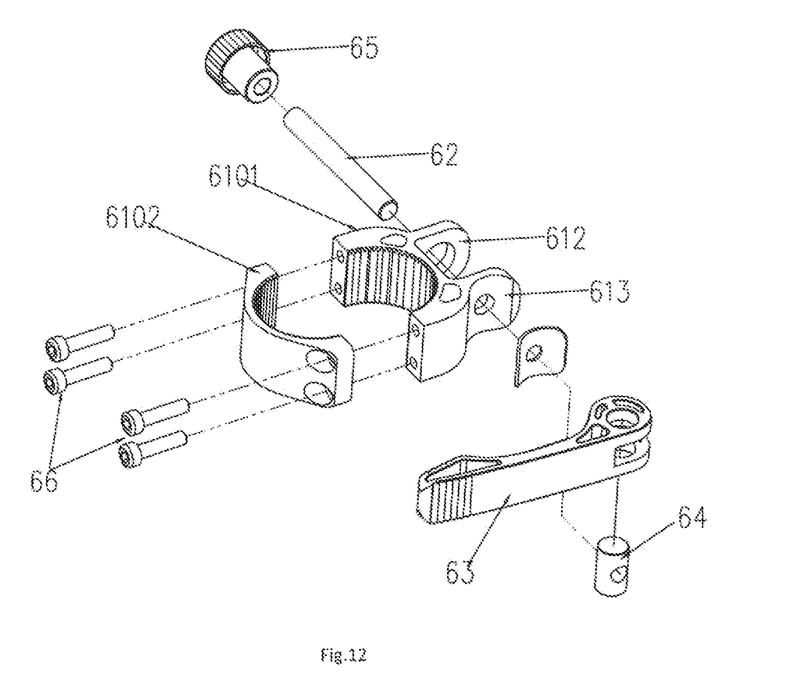
FIG. 12 is an exploded view illustrating another kind of clamping ring for the seat tube of the reinforcing and locking device for vehicle frame of the present invention.

As shown in FIG. 12, the connecting component comprises a front cover 6101 and a rear cover 6102. The front cover and the rear cover are joined together to clamp the seat tube. The front cover and the rear cover are joined and locked through bolts 66. The front cover 6101 is provided with clamp heads 612, 613. The rod 62 of the eccentric locking component, which is provided with a nut 65 on one end and an eccentric handle 63 on the other end, runs through the clamp heads of the integral clamping ring. The hook at the rear end of the reinforcing component hooks the rod 62 and is locked and fixed. The hook at the rear end of the reinforcing component may not fit around the rod 62 perfectly due to manufacturing errors. In this embodiment, the position of the connecting component on the seat tube can be adjusted up and down until the connecting component is at a perfect fitting position, the connecting component is locked on the seat tube through the bolts, so that, the manufacturing errors can be counteracted and the function of the device is realized successfully.

Figure 13:
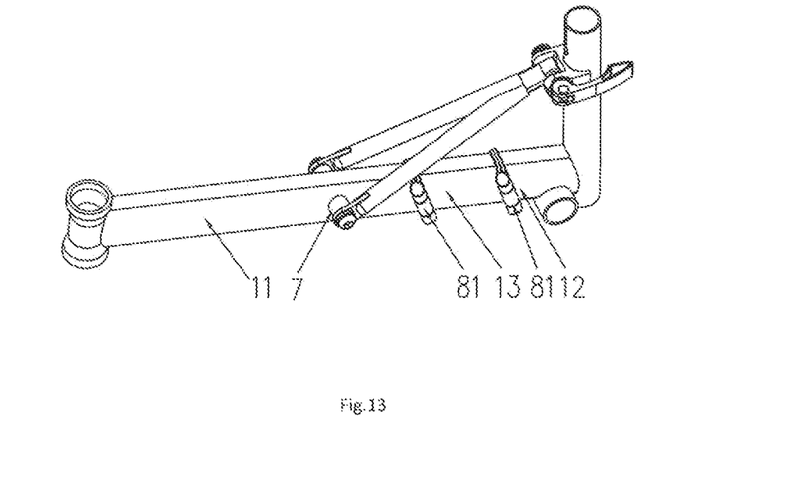
FIG. 13 is a schematic view illustrating the locked reinforcing component according to the fourth embodiment of the reinforcing and locking device for vehicle frame of the present invention.
Figure 14:
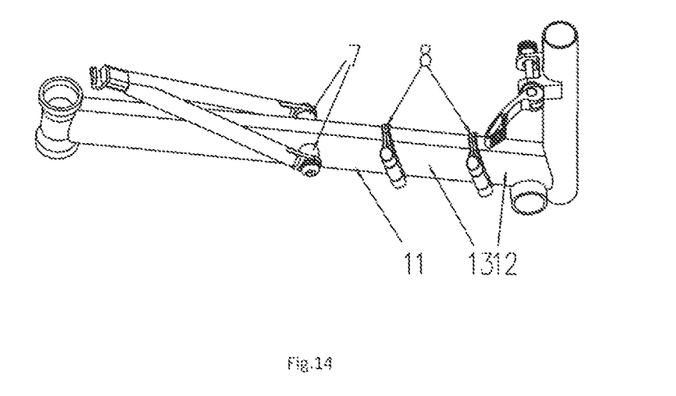
FIG. 14 is a schematic view illustrating the unlocked reinforcing component according to the fourth embodiment of the reinforcing and locking device for vehicle frame of the present invention.
Figure 15:
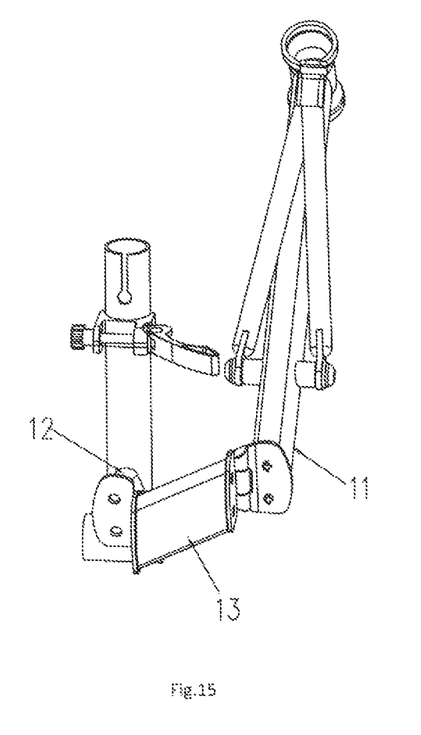
FIG. 15 is a schematic view illustrating the folded vehicle frame according to the fourth embodiment of the reinforcing and locking device for vehicle frame of the present invention.

As shown in FIGS. 13-15, in the fourth embodiment, the beam comprises three or more segments. Now take the beam with three segments as an example, the beam 1 comprises the front segment 11, the rear segment 12 and the intermediate segment 13. Two hinge axles 81 are provided respectively between the front segment 11 and the rear segment 12, and between the rear segment 12 and the intermediate segment 13. The two hinge axles 81 are disposed in parallel at the same side of the beam. The front ends of the two arms of the reinforcing component 2 are joined to the first hinged shaft 7. The traverse distance between the front ends of two arms of the reinforcing component 2 is greater than the transverse width of the beam 1, therefore greater bending moment can be produced when the hook end of the reinforcing component 2 moves to the same side where the hinge axles 81 are disposed, and a greater pretightening force will be produced for the contact interfaces of the three segments of the beam. The greater pretightening force makes the beam more stable so that the contact interfaces of the beam will not be released in cycling. What's more, the reinforcing component 2 is connected to the seat tube and the beam, which will improve the strength of the beam greatly. The feature that the hook of the reinforcing component is connected to the seat tube is just the same as described above and it is not described here in details.

As shown in FIG. 15, when the vehicle is folded, the intermediate segment 13 of the beam is approximately perpendicular to the front segment 11 and the rear segment 12 of the beam, while the front segment 11 and the rear segment 12 are disposed at the same side of the intermediate segment 13. Therefore the length of the beam with three segments is further reduced relative to the beam with two segments after the vehicle is folded, and the size of the packing case can also be reduced, which saves the wrapper and storage space, and is environment friendly and easy for storage.

A common feature of the embodiments described above is that when the reinforcing component is locked, it will be subjected to a force exerted by the eccentric handle, under which the hook end of the reinforcing component makes a horizontal displacement to the hinge axle of the beam. The displacement will bring a pretightening force to the contact interfaces of the beam, so that the beam will be more stable and not easy to be disjoined. The common feature mentioned above is a remarkable distinguishing feature of the present invention from the publicly disclosed Chinese patent application No. 200510025883.2. In all embodiments described above, the eccentric handle and the hinge axle of the beam are disposed at the same side of the beam. After the eccentric handle is tightened, it will exert a force on the hook of the reinforcing component so that the hook end of the reinforcing component makes a horizontal displacement to the hinge axle of the beam, which is described only as an example. Alternatively, the eccentric handle and the hinge axle of the beam may be provided at the different side of the beam according to actual demand. When the eccentric handle is tightened, it will produce a pushing force to pull the hook of the reinforcing component. The modifications of the structure by those skilled in mechanic will be easily taught by the embodiments described above, and it is not described here in details.

Figure 16:
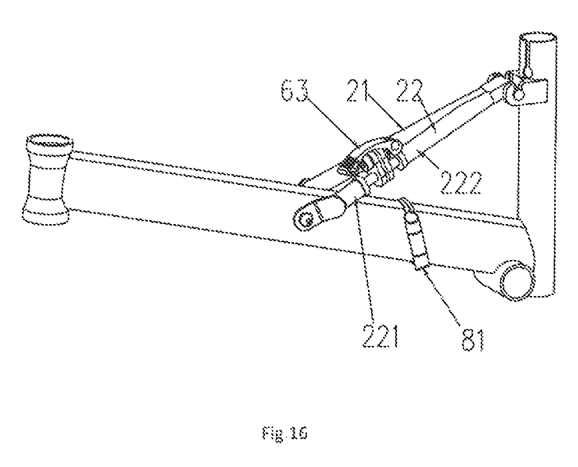
FIG. 16 is a schematic view illustrating the fifth embodiment of the reinforcing and locking device for vehicle frame of the present invention.
Figure 17:
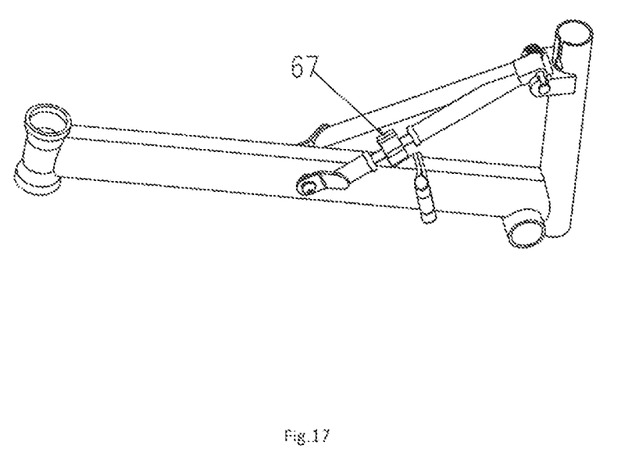
FIG. 17 is another schematic view illustrating the fifth embodiment of the reinforcing and locking device for vehicle frame of the present invention.

As shown in FIGS. 16 and 17, in the fifth embodiment, the front end of the reinforcing component 2 is ∩-shaped or Λ-shaped so as to have two arms. The rear end of the reinforcing component is connected to the connecting part on the seat tube. An arm 22 of the reinforcing component near to the hinge axle 81 comprises two segments 221 and 222. Between the two segments of the arm, a gap is disposed and a locking structure is provided. After the rear end of the reinforcing component is connected to the connecting part on the seat tube, the gap between the two segments 221 and 222 of the reinforcing component is reduced by turning the eccentric handle 63 under the force. And the rear end of the reinforcing component will move slightly to the side where the hinge axle 81 disposed under the force, so as to produce a locking force for the contact interfaces of the beam.

As shown in FIG. 17, in order to realize the same function, the locking structure described above is replaced with a nut. A gap is disposed between the two segments of the arm, and threads are provided at the two ends of the segments 221 and 222 of the reinforcing component near the gap. The gap is reduced by turning the nut 67.

Figure 18:
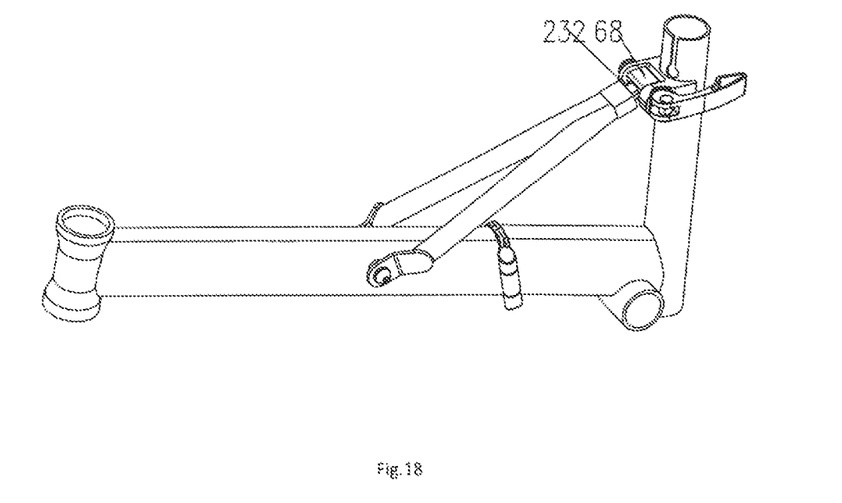
FIG. 18 is a schematic view illustrating another way of connecting the reinforcing component of the reinforcing and locking device for vehicle frame of the present invention.

As shown in FIG. 18, based on the first embodiment to the fifth embodiment, no hook is provided at the rear end of the reinforcing component 2 to engage with the rod, but a protruding head 232 is provided at the rear end of the reinforcing component 2 to match a rotatable box 68, which is provided on the rod 62 of the eccentric locking component and has an opening to contain the protruding head 232. When fold the bicycle, turn over the rotatable box 68 upwards, and the protruding head 232 will turn upwards correspondingly to break away from the opening of the rotatable box 68.

Figure 19:
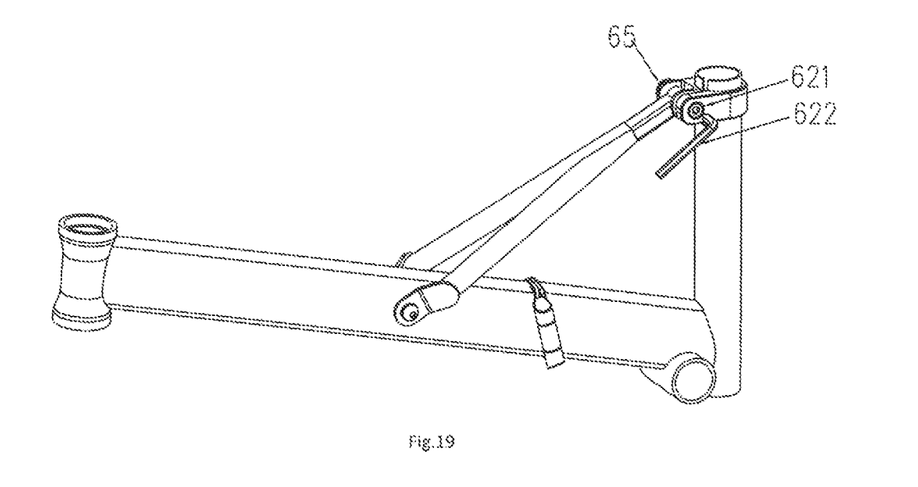
FIG. 19 is a schematic view illustrating the locking component in another embodiment of the reinforcing and locking device for vehicle frame of the present invention.
Figure 20:
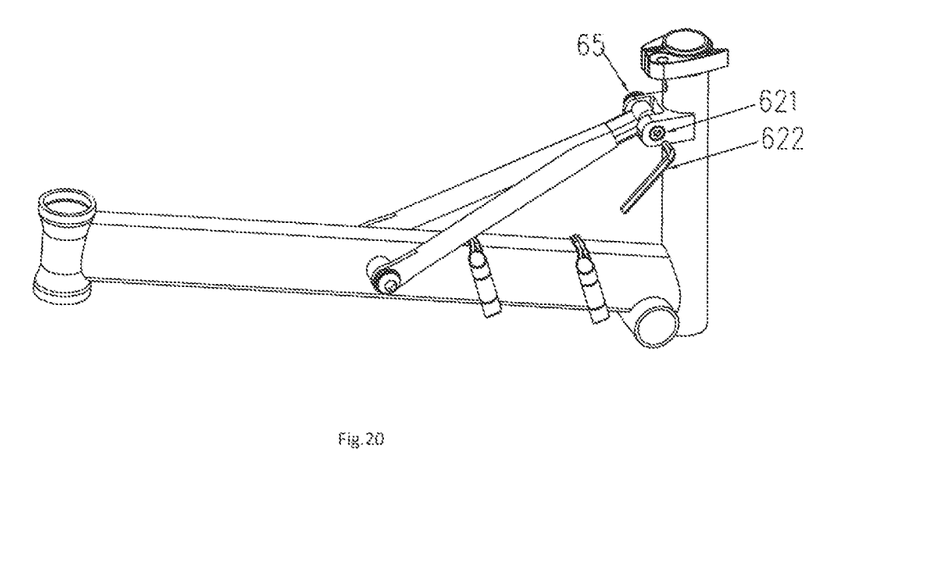
FIG. 20 is another schematic view illustrating the locking component in another embodiment of the reinforcing and locking device for vehicle frame of the present invention.

As shown in FIGS. 19 and 20, the rear end of the reinforcing component is connected to the seat tube through the connecting component, and the reinforcing component is locked through a locking component. The rear end of the reinforcing component deviates from its original position in natural connection and moves to the side where the eccentric handle is installed after it is locked. The locking component comprises a bolt and a nut. After the rear end of the reinforcing component is connected to the seat tube, turn the nut with a wrench 622, so that the rear end of the reinforcing component moves to the side where the eccentric handle is installed to produce the pretightening force for the contact interfaces of the beam.

Moreover, in all of the embodiments described above, in the state where the rear end of the reinforcing component is connected to the seat tube, if the angle between the contact interface of each segment of the beam and the reinforcing component 2 ranges from 80 degrees to 100 degrees, the reinforcing component can bear greater bending moment. Specially, the best scheme is that the contact interfaces of the front segment 11 and the rear segment 12 of the beam are roughly perpendicular to the reinforcing component 2. In practice, interference from the folded vehicle body and the height difference of the clamping ring for the seat tube and the beam must be considered. The angle between the contact interfaces and the reinforcing component 2 may not reach 90 degrees.

In all of the embodiments described above, the hinge axle 81 is perpendicular to the horizontal plane, in order that when the front segment and the rear segment are folded, the front wheel and the rear wheel of the bicycle can be turned against the ground, so that the weight of the bicycle can be borne by the ground. It's very convenient and easy for users to fold or unfold the bicycle. However, in the publicly disclosed Chinese patent application No. 200510025883.2, the hinge axle is disposed horizontally. When the front segment and the rear segment are folded, the front wheel and the rear wheel of the bicycle can only be turned in a plane perpendicular to the ground, so the users have to lift the vehicle frame to fold the beam. It is inconvenient and difficult for users, especially for pupils to fold the bicycle.

The reinforcing and locking device for vehicle frame of the present invention is not only applicable to bicycles, but also applicable to tricycles, motor scooters and so on.

The preferred embodiments described above are not restricted. It will be understood by those skilled in the art that various modifications, identical replacements and improvements may be made therein without departing from the scope of the invention.

What is claimed is:

1. A reinforcing and locking device for vehicle frame, wherein, the vehicle frame includes a beam (1) and a seat tube (3); the beam includes at least two foldable segments; a hinge axle (81) for hinging the segments of the beam is provided vertically; the reinforcing and locking device includes a reinforcing component (2), a connecting component and an eccentric locking component; the reinforcing component (2) is connected with the beam and the seat tube;

wherein, the connecting component is installed on the seat tube and is provided with clamp heads, a front end of the reinforcing component is hinged to a front segment (11) of the beam, a rear end of the reinforcing component is connected to the seat tube through the connecting component;

whereby, in an original position of natural connection, a center of the rear end of the reinforcing component deviates from a vertical plane containing a center line of the beam; and the center of the rear end of the reinforcing component and the hinge axle of the beam are respectively disposed at different sides of the vertical plane containing the center line of the beam;

wherein the eccentric locking component comprises a rod, a nut and an eccentric handle; the eccentric handle and the hinge axle are disposed at a same side of the beam; the rod transversely runs through the clamp heads of the connecting component; the nut is disposed on one end of the rod and the eccentric handle is disposed on the other end of the rod; and wherein the rear end of the reinforcing component is provided with a hook, which hooks the rod; and wherein the hook of the rear end of the reinforcing component is locked by the eccentric locking component, and the rear end of the reinforcing component deviates from the original position and moves to one side of the beam where the hinge axle is installed.

2. The reinforcing and locking device for vehicle frame according to claim 1, wherein, the front end of the reinforcing component is ∩-shaped or Λ-shaped so as to have two arms; and the two arms are respectively hinged to two ends of a second hinged shaft, which is fixed on the front segment of the beam and the two ends thereof extends towards two sides of the beam respectively.

3. The reinforcing and locking device for vehicle frame according to claim 2, wherein, traverse distance between front ends of the two arms of the reinforcing component is greater than transverse width of the beam.

4. The reinforcing and locking device for vehicle frame according to claim 2, wherein, one arm of the reinforcing component, which is near to the hinge axle, comprises two segments; and between the two segments of the arm, a gap is disposed and a locking structure is provided.

5. The reinforcing and locking device for vehicle frame according to claim 4, wherein, the connecting component is an integral clamping ring integrated by a connecting part and a clamping ring for the seat tube.

6. The reinforcing and locking device for vehicle frame according to claim 4, wherein, the connecting component comprises a front cover and a rear cover; the front cover and the rear cover are joined and locked through bolts; and the front cover is provided with the clamp heads.

7. The reinforcing and locking device for vehicle frame according to claim 4, wherein, the beam comprises three segments and is provided with two hinge axles which are parallel; and when the vehicle is folded, axis of an intermediate segment of the beam is approximately perpendicular to those of a front segment and a rear segment of the beam.

8. The reinforcing and locking device for vehicle frame according to claim 4, wherein, the rear end of the reinforcing component deviates from the original position and moves to one side of the beam where the hinge axle is installed, with a displacement ranging from 2 mm to 8 mm.

9. The reinforcing and locking device for vehicle frame according to claim 1, wherein, a base with two projecting lugs is provided on the front segment of the beam; and the front end of the reinforcing component is hinged between the two projecting lugs through a first hinged shaft.

10. The reinforcing and locking device for vehicle frame according to claim 1, wherein, the connecting component is an integral clamping ring integrated by a connecting part and a clamping ring for the seat tube.

11. The reinforcing and locking device for vehicle frame according to claim 10, wherein, surfaces of two clamp heads of the integral clamping ring deviate from a center of the integral clamping ring; the integral clamping ring is additionally provided with a reinforcing lug parallel to the clamp heads; and the reinforcing lug and the two clamp heads are respectively disposed at different sides of the center of the integral clamping ring.

12. The reinforcing and locking device for vehicle frame according to claim 1 wherein, the connecting component comprises a front cover and a rear cover; the front cover and the rear cover are joined and locked through bolts; and the front cover is provided with the clamp heads.

13. The reinforcing and locking device for vehicle frame according to claim 1, wherein, the beam comprises three segments and is provided with two hinge axles which are parallel; and when the vehicle is folded, axis of an intermediate segment of the beam is approximately perpendicular to those of a front segment and a rear segment of the beam.

14. The reinforcing and locking device for vehicle frame according to claim 1, wherein, the rear end of the reinforcing component deviates from the original position and moves to one side of the beam where the hinge axle is installed, with a displacement ranging from 2 mm to 8 mm.

* * * * *